US006623278B2

(12) United States Patent
Follingstad et al.

(10) Patent No.: US 6,623,278 B2
(45) Date of Patent: *Sep. 23, 2003

(54) HIGH DENSITY PATCHING SYSTEM

(75) Inventors: Michael J. Follingstad, Edina, MN (US); James W. Conroy, Prior Lake, MN (US); Peter W. Adams, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/074,681

(22) Filed: Feb. 12, 2002

(65) Prior Publication Data

US 2002/0119681 A1 Aug. 29, 2002

Related U.S. Application Data

(63) Continuation of application No. 09/644,364, filed on Aug. 23, 2000, now Pat. No. 6,345,986, which is a continuation of application No. 09/293,026, filed on Apr. 16, 1999, now Pat. No. 6,186,798.

(51) Int. Cl.⁷ .............................................. H01R 12/00
(52) U.S. Cl. ....................................................... 439/64
(58) Field of Search ........................... 439/76.1, 64, 61, 439/377, 922; 361/724, 727, 752, 796

(56) References Cited

U.S. PATENT DOCUMENTS 3,950,057 A    4/1976   Calabro ...................... 439/377

(List continued on next page.)

OTHER PUBLICATIONS

Photos 1–7 showing ADC Telecommunications, Inc. "Dense Pack" product. Photos 8–14 showing ADC Telecommunications, Inc. "PatchMate" product.

(List continued on next page.)

*Primary Examiner*—Tulsidas Patel
(74) *Attorney, Agent, or Firm*—Merchant-Gould, P.C.

(57) ABSTRACT

The present disclosure relates to high density patching system. The system includes a card housing having a front end positioned opposite from a rear end. The card housing includes top and bottom walls extending between the front and rear ends. The top and bottom walls define opposing sets of top and bottom slots. The patching system also includes a plurality of patch cords including patch plugs each having a width $W_1$ and a height $H_1$. The patching system further includes a plurality of jack access cards adapted to be mounted in the card housing, and a rear interface module positioned at the rear end of the card housing. The jack access cards include circuit boards having top and bottom edges adapted to fit within the sets of top and bottom slots defined by the card housing. The jack access cards also include a plurality of card edge contacts positioned at a rear of each circuit board. The jack access cards further include front interface pieces having heights $H_2$ that are greater than two times the height $H_1$, and widths $W_2$ that are each less than two times the width $W_1$. The front interface pieces each define upper and lower patch plug ports that are vertically spaced along the height $H_2$ of each front interface piece. The upper and lower patch plug ports are sized and shaped to receive only a single one of the patch plugs at a time. The rear interface module includes a single row of card edge connectors adapted for providing electrical connections with the card edge contacts of the jack access cards. The rear interface module also includes an array of rear connectors including upper and lower rows of rear connectors. The array of rear connectors is electrically connected to the card edge connectors by a flexible circuit board. The rear interface module also includes a frame that spaces the card edge connectors from the rear connectors. The frame includes a rear wall defining upper and lower rows of openings that respectively receive the upper and lower rows of rear connectors.

12 Claims, 15 Drawing Sheets

U.S. PATENT DOCUMENTS

| | | | |
|---|---|---|---|
| 4,022,326 A | 5/1977 | Marconi | 211/41.17 |
| 4,134,631 A | 1/1979 | Conrad et al. | 439/61 |
| 4,744,006 A | 5/1988 | Duffield | 439/61 |
| 5,014,163 A | 5/1991 | Lin | 361/796 |
| 5,099,391 A | 3/1992 | Maggelet et al. | 439/76.1 |
| 5,162,980 A * | 11/1992 | Morgan et al. | 361/818 |
| 5,220,600 A | 6/1993 | Chouanard et al. | 379/327 |
| 5,348,482 A | 9/1994 | Rudy, Jr. et al. | 439/61 |
| 5,388,995 A | 2/1995 | Rudy, Jr. et al. | 439/61 |
| 5,413,494 A | 5/1995 | Dewey et al. | 439/188 |
| 5,432,847 A | 7/1995 | Hill et al. | 379/328 |
| 5,546,282 A | 8/1996 | Hill et al. | 361/796 |
| 5,685,741 A | 11/1997 | Dewey et al. | 439/668 |
| 5,734,561 A | 3/1998 | Wolf et al. | 361/800 |
| 5,791,917 A | 8/1998 | Eberhardt et al. | 439/377 |
| 6,186,798 B1 | 2/2001 | Follingstad et al. | 439/76.1 |
| 6,345,986 B1 | 2/2002 | Follingstad et al. | 439/64 |

OTHER PUBLICATIONS

ADC Telecommunications "Network Control PatchMate™ and PatchSwitch™ Products" catalog, Sixth Edition, 72 pages (Nov. 19, 1995).

ADC Telecommunications "Professional Audio and Video Products" catalog, 5th Edition, pp. 29–31 (Mar. 19, 1996).

* cited by examiner

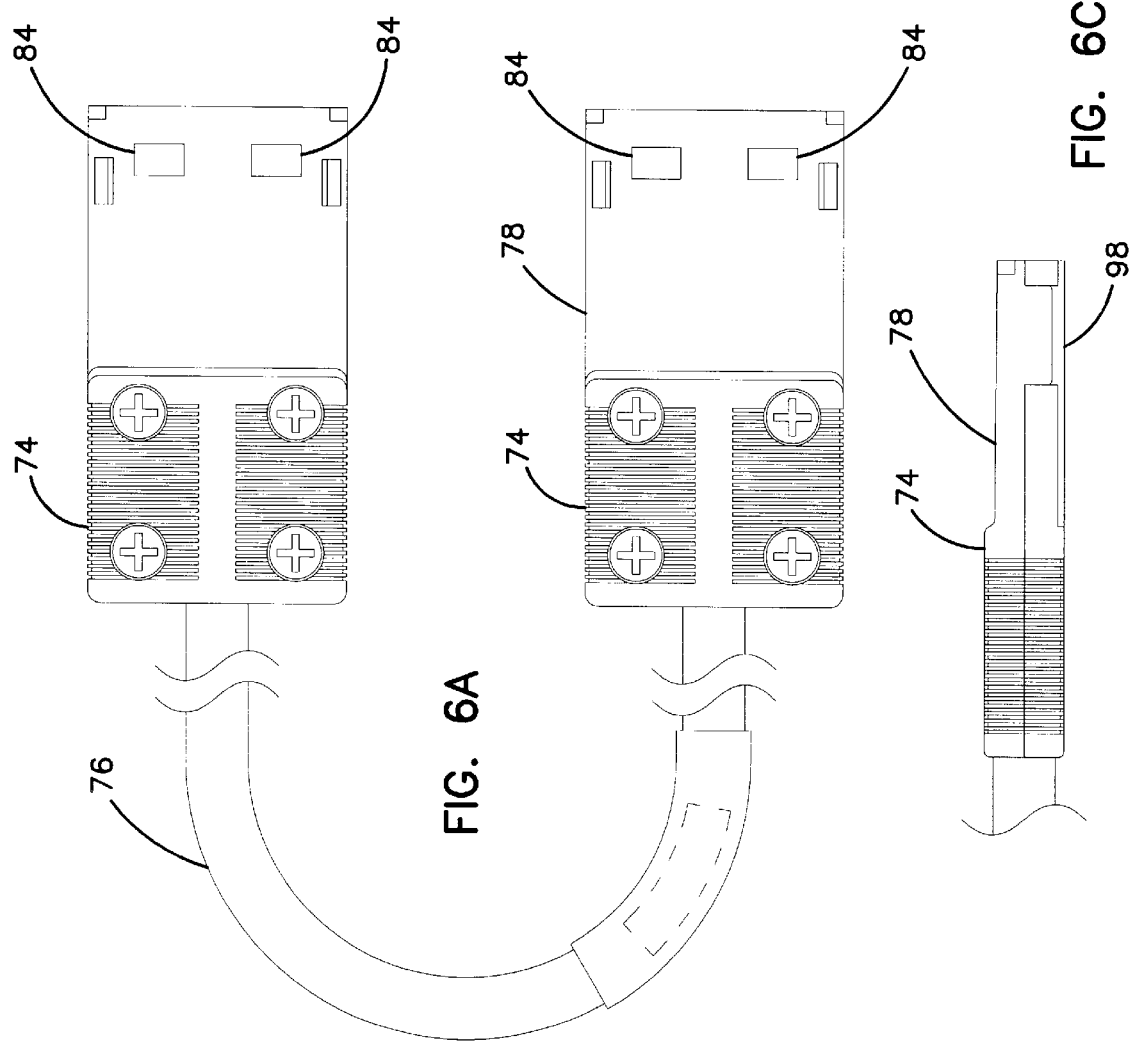

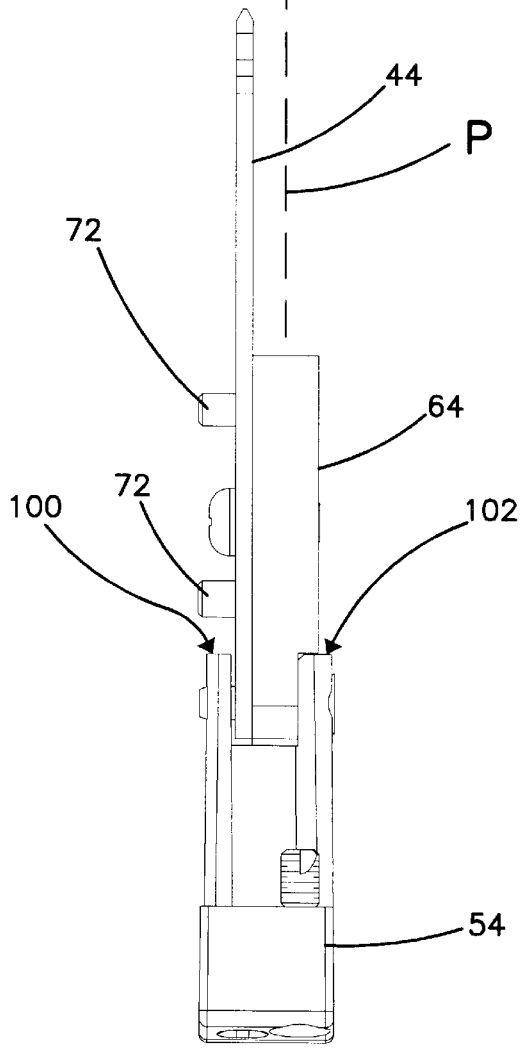
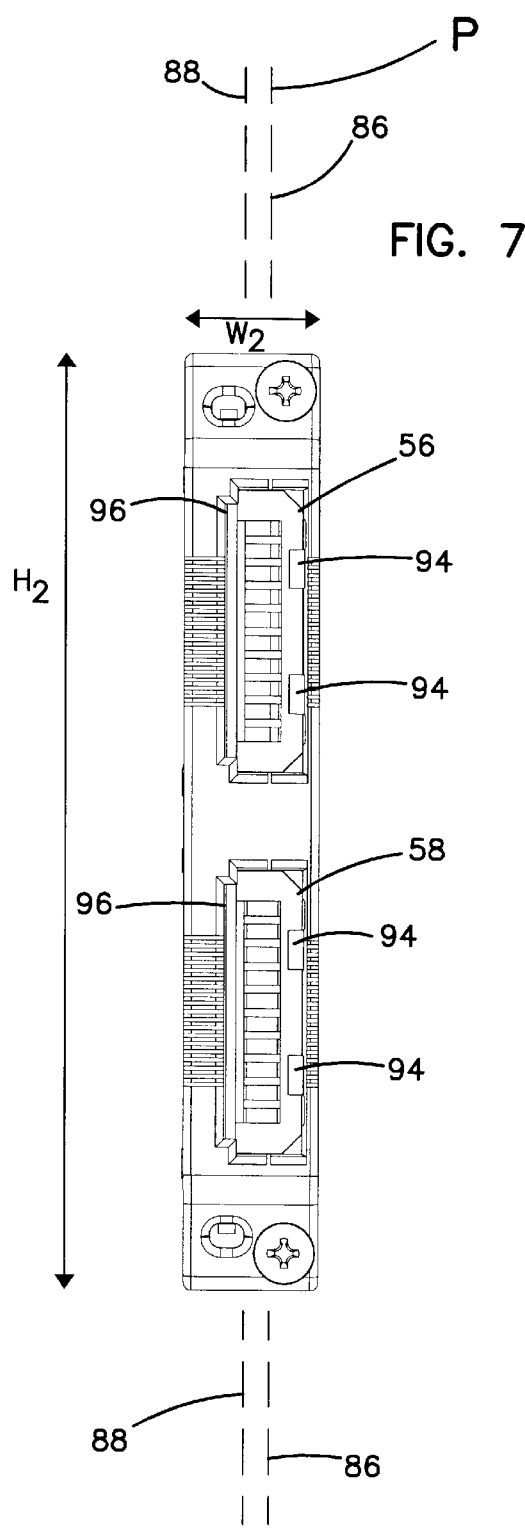
FIG. 8
FIG. 7

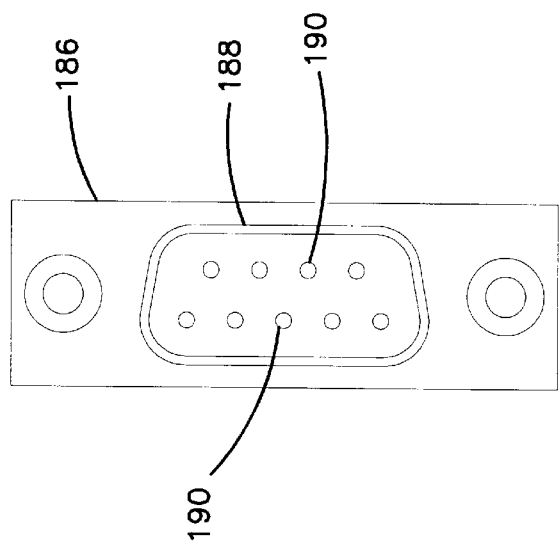
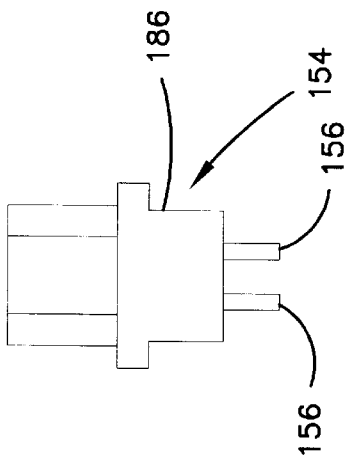
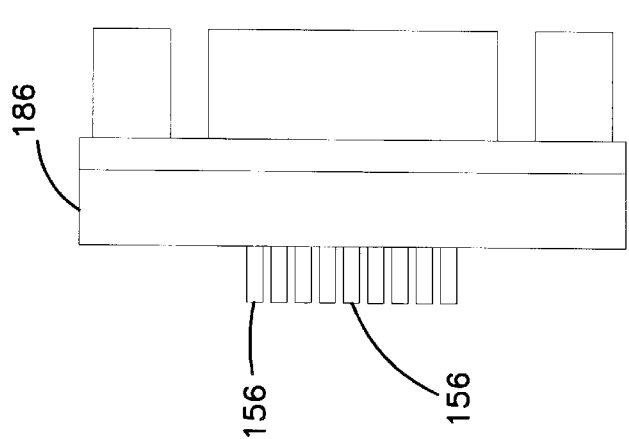
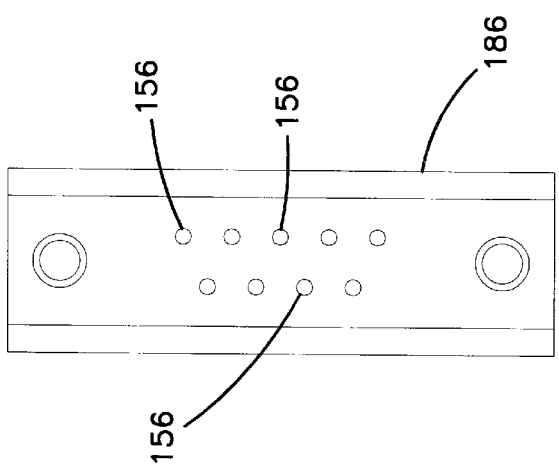

HIGH DENSITY PATCHING SYSTEM

CROSS-REFERENCE TO RELATED APPLICATIONS

This application is a continuation of U.S. patent application Ser. No. 09/644,364, filed Aug. 23, 2000, now U.S. Pat. No. 6,345,986, issued Feb. 12, 2002, which is a continuation of application Ser. No. 09/293,026, filed Apr. 16, 1999, now U.S. Pat. No. 6,186,798, issued Feb. 13, 2001, which applications are incorporated herein by reference.

FIELD OF THE INVENTION

The present invention relates generally to high density patching systems. More particularly, present invention relates patching systems for voice or data communication applications such as audio and video entertainment applications.

BACKGROUND OF THE INVENTION

Patching systems are frequently used in data transmission applications to improve system flexibility and reliability. One type of existing patching system includes a plurality of jack access cards that are mounted in a chassis. Each jack access card interfaces with a pair of rear connectors. A first rear connector of each pair is typically connected to a user's transmitter (e.g., a machine or other piece of equipment that transmits signals or data). A second rear connector of each pair is typically connected to user's receiver (e.g., a machine or other piece of equipment that receives signals or data). Transmissions from the transmitter enter the patching system through the first rear connector, travel through a circuit path provided by one of the jack access cards, and exit the patching system through the second rear connector. Normally, the circuit is closed. However, by inserting a patch plug into a patch port defined by the jack access card, the circuit is opened and the transmission from the user's transmitter is diverted through the patch plug to a secondary piece of equipment (e.g., a back-up receiver, diagnostic equipment, equipment performing alternative functions, etc.).

Ease of use and reliability are factors relevant to the design of patching systems. Other factors include cost, circuit density, and interchangeability or modularity of parts.

SUMMARY OF THE INVENTION

One aspect of the present invention relates to a jack access card adapted for use with patch cords equipped with patch plugs each having a width $W_1$ and height $H_1$. The jack access card includes a circuit board having a front end positioned opposite from a rear end. A plurality of card edge contacts are positioned at the rear end of the circuit board. Upper and lower sets of spring contacts are also positioned on the circuit board. The upper and lower sets of spring contacts each include front contacts positioned near the front of the circuit board, and intermediate contacts positioned generally between the front contacts and the card edge contacts. A first plurality of tracings electrically connect selected ones of the intermediate contacts to selected ones of the card edge contacts. A second plurality of tracings electrically connect selected ones of the front contacts corresponding to the upper set of spring contacts with selected ones of the front contacts corresponding to the lower set of spring contacts. The jack access card also includes upper and lower sets of springs adapted to selectively provide electrical connections between the front and intermediate contacts.

The jack access card further includes a front interface piece positioned at the front of the circuit board. The front interface piece has a height $H_2$ that is greater than two times the height $H_1$, and a width $W_2$ that is less than two times the width $W_1$. The front interface piece defines upper and lower patch plug ports that are vertically spaced along the height $H_2$ of the front interface piece. The upper and lower patch plug ports are sized and shaped to each receive only a single one of the patch plugs at a time.

Another aspect of the present invention relates a rear interface module for a high density patching system. The rear interface module includes a frame including a front end positioned opposite from a rear end. The frame also includes opposing top and bottom walls extending between the front and rear ends. The frame further includes a rear wall that interconnects the top and bottom walls. The rear wall is located at the rear end of the frame and defines two vertically spaced-apart rows of openings. The rear interface module also includes a single row of card edge connectors positioned at the front end of the frame. The card edge connectors include a plurality and first pins that project toward the rear end of the frame. The rear interface module further includes two vertically spaced-apart rows of rear connectors mounted at the rear wall of the frame. At least portions of the rear connectors extend through the vertically spaced-apart openings. The rear connectors include a plurality of second pins that project toward the front end of the frame. The first pins corresponding to the card edge connectors are electrically connected to the second pins corresponding to the rear connectors by a flexible circuit board that is positioned between the top and bottom walls of the frame.

A further aspect of the present invention relates to a high density patching system. The system includes a card housing having a front end positioned opposite from a rear end. The card housing includes top and bottom walls extending between the front and rear ends. The top and bottom walls define opposing sets of top and bottom slots. The patching system also includes a plurality of patch cords including patch plugs each having a width $W_1$ and a height $H_1$. The high density patching system further includes a plurality of jack access cards adapted to be mounted through the front end of the card housing, and a rear interface module positioned at the rear end of the card housing. The jack access cards of the patching system include circuit boards having top and bottom edges adapted to fit within the sets of top and bottom slots defined by the card housing. The jack access cards also include a plurality of card edge contacts positioned at a rear of each circuit board, and a front interface piece positioned at a front of each circuit board. The front interface pieces have heights $H_2$ that are each greater than two times the height $H_1$, and widths $W_2$ that are less than two times the width $W_1$. The front interface pieces each define upper and lower patch plug ports that are vertically spaced along the height $H_2$ of each interface piece. The upper and lower patch plug ports are sized and shaped to receive only a single one of the patch plugs at a time. The rear interface module of the patching system includes a single row of card edge connectors adapted for providing electrical connections with the card edge contacts of the jack access cards. The rear interface module also includes an array of rear connectors. The array of rear connectors is electrically connected to the card edge connectors by a flexible circuit board. The frame of the module spaces the card edge connectors from the rear connectors.

A variety of advantages of the invention will be set forth in part and the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows:

FIG. 6A illustrates a patch cord suitable for use with the patching system of FIG. 1;

FIG. 6B is a right end view of one of the patch plugs of the patch cord of FIG. 6A;

FIG. 6C is a top view of one of the patch plugs of the patch cord of FIG. 6A;

FIG. 7 is a front view of the jack access card of FIG. 3;

FIG. 8 is a top view of the jack access card of FIG. 3;

FIG. 13A is a rear view of a rear connector suitable for use with the rear interface module of FIG. 10;

FIG. 13B is a side view of the rear connector of FIG. 13A;

FIG. 13C is a front view of the rear connector of FIG. 13A;

FIG. 13D is a bottom view of the rear connector of FIG. 13A;

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
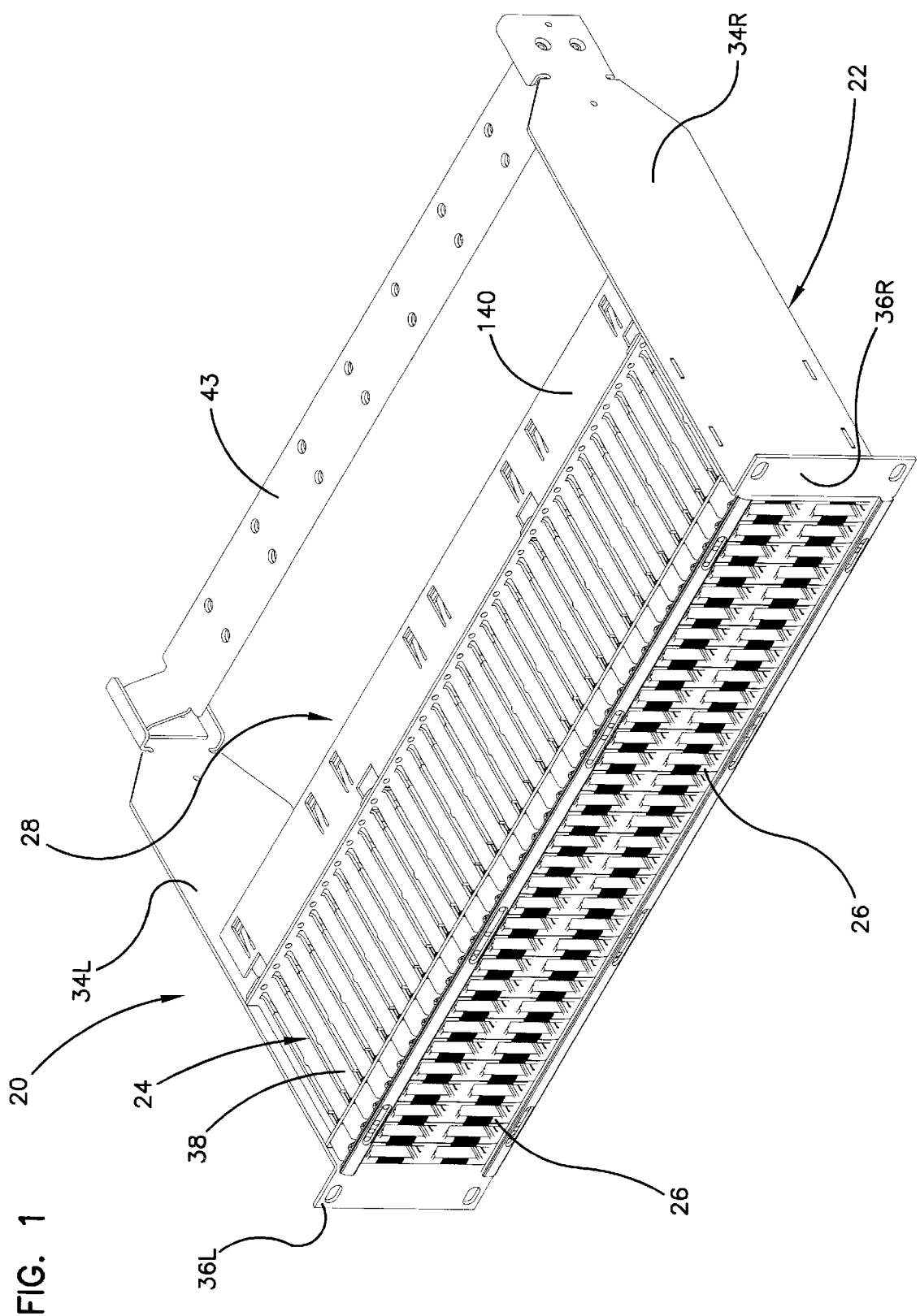
FIG. 1 is a perspective view of a high density patching system constructed in accordance with the principles of the present invention.
Figure 2:
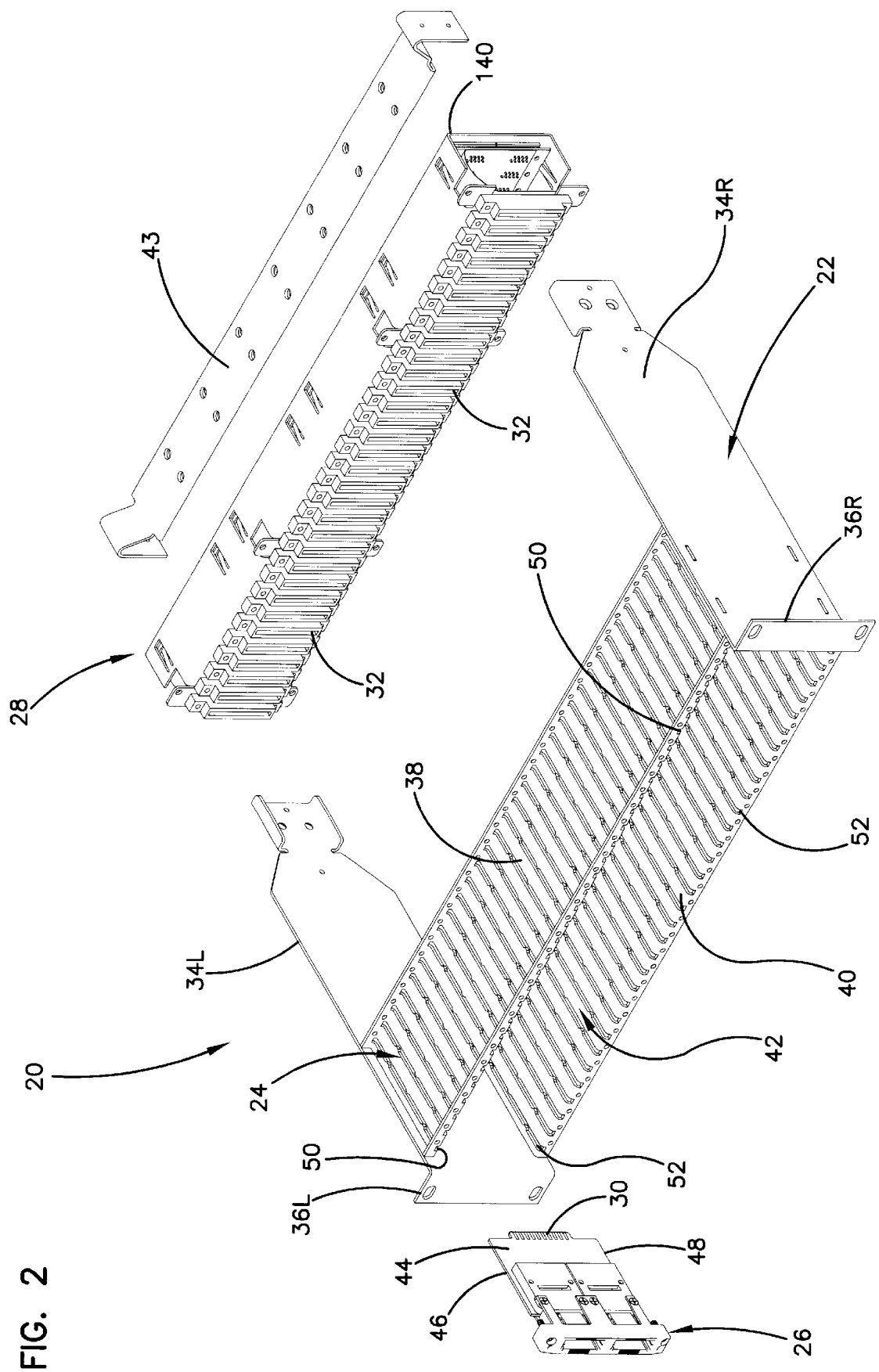
FIG. 2 is an exploded view of the patching system of FIG. 1.

FIGS. 1 and 2 illustrate a patching system 20 constructed in accordance with the principles of the present invention. The patching system 20 includes a chassis 22 including a card housing 24. The patching system 20 also includes a plurality of jack access cards 26 adapted to be mounted in the card housing 24. The patching system 20 further includes a rear interface module 28 mounted at a rear side of the card housing 24. As shown in FIG. 2, the jack access cards 26 include rear card edge contacts 30. When the jack access cards 26 are mounted within the card housing 24, the rear card edge contacts 30 fit within corresponding card edge connectors 32 of the rear interface module 28. In this manner, electrical connections are provided between the jack access cards 26 and the rear interface module 28.

The chassis 22 includes opposing left and right sidewalls $34_L$ and $34_R$. At the front of the chassis 22. Left and right flanges $36_L$, $36_R$ project transversely outward from the sidewalls $34_L$, $34_R$. The flanges $36_L$, $36_R$ are adapted for use in connecting the chassis 22 to a rack (not shown). A rear support member 43 is connected between the left and right side walls $34_L$, $34_R$ to enhance the structural rigidity of the chassis 22.

The chassis 22 also includes opposing top and bottom walls 38 and 40 that extend between the left and right sidewalls $34_L$, $34_R$. The sidewalls $34_L$, $34_R$ and the top and bottom walls 38, 40 cooperate to form the card housing 24. The card housing defines a hollow bay 42 that preferably has a width of about 19 inches and a height of about 3.5 inches. As shown in FIG. 1, the bay 42 is fully loaded with a plurality (e.g., 32) individual jack access cards 26. The jack access cards 26 are connected to upper and lower flanges of the card housing 24 by conventional fasteners (e.g., bolts, screws, snap-fit connectors, etc.).

Referring to FIG. 2, the chassis 22 is illustrated with the jack access cards 26 removed from the bay 42. For clarity, only one of the jack access cards 26 is shown exploded from the chassis 22. The illustrated jack access card 26 includes a circuit board 44 having upper and lower edges 46 and 48 adapted to slide within corresponding upper and lower slots 50 and 52 defined by the card housing 24. Preferably, the card housing 24 defines 32 pairs of the upper and lower slots 50 and 52 such that 32 of the jack access cards 26 can be mounted in the chassis 22.

Figure 3:
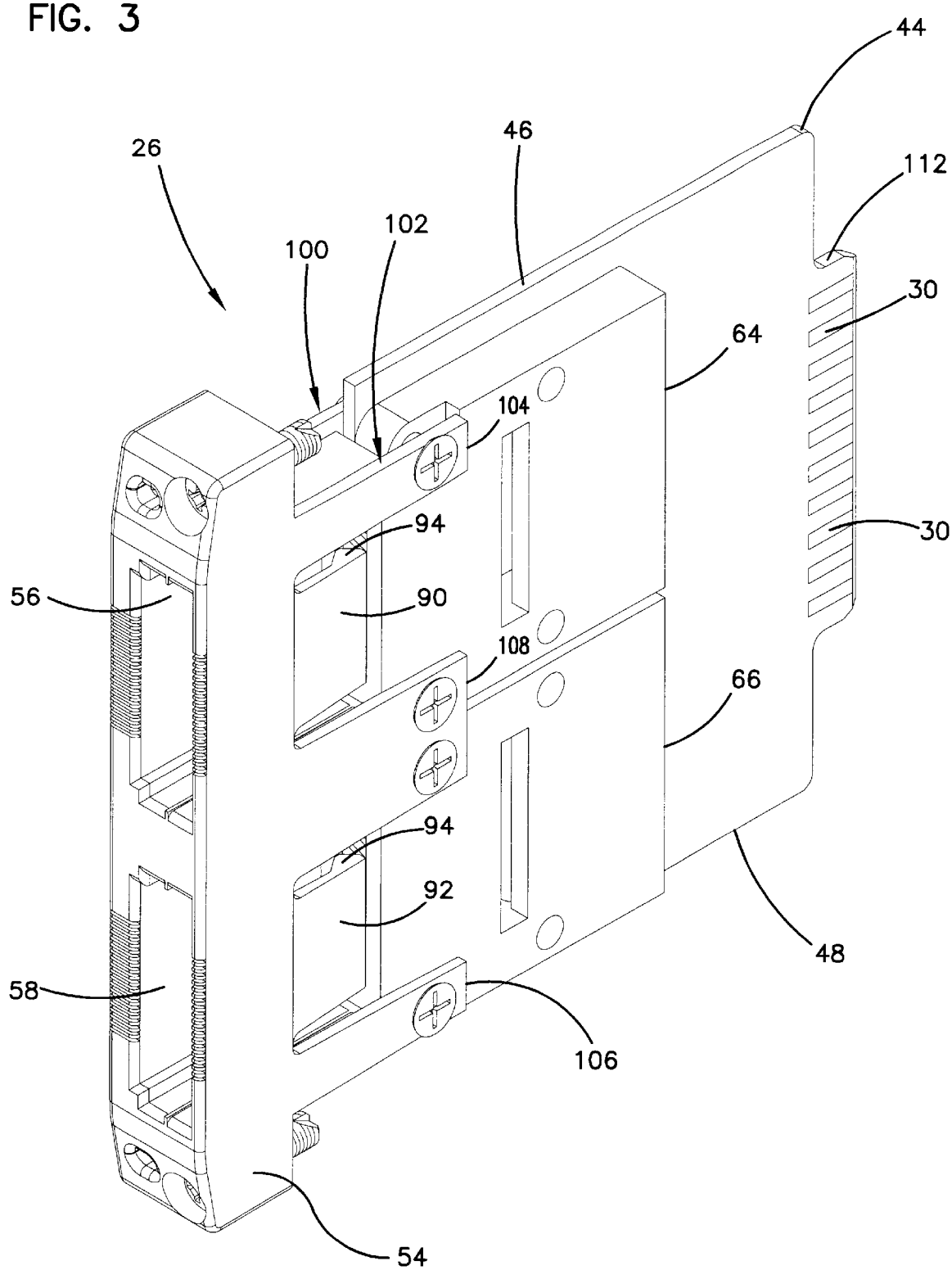
FIG. 3 is a perspective view of jack access card adapted for use with the patching system of FIG. 1.
Figure 4:
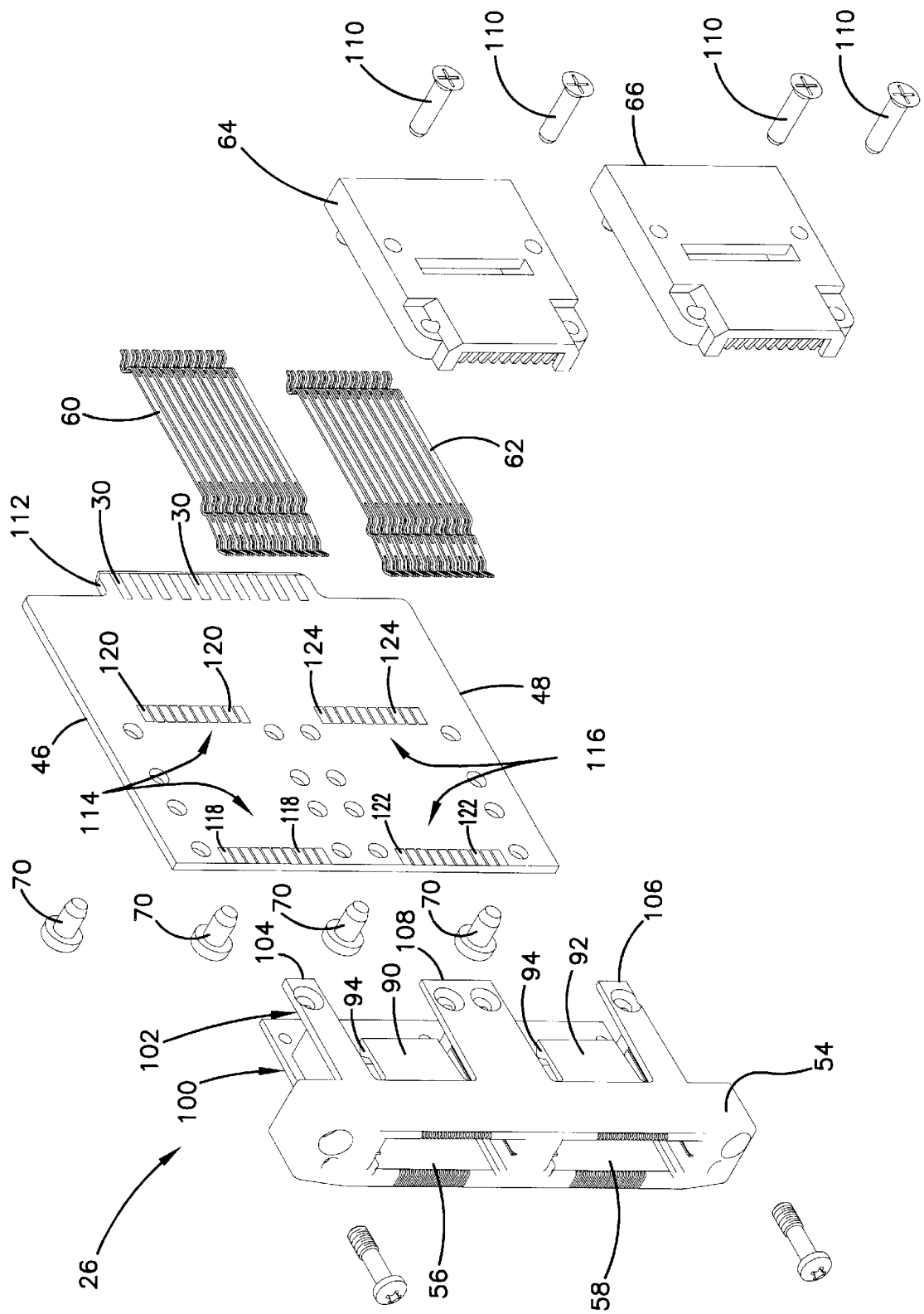
FIG. 4 is an exploded view of the jack access card of FIG. 3.
Figure 5:
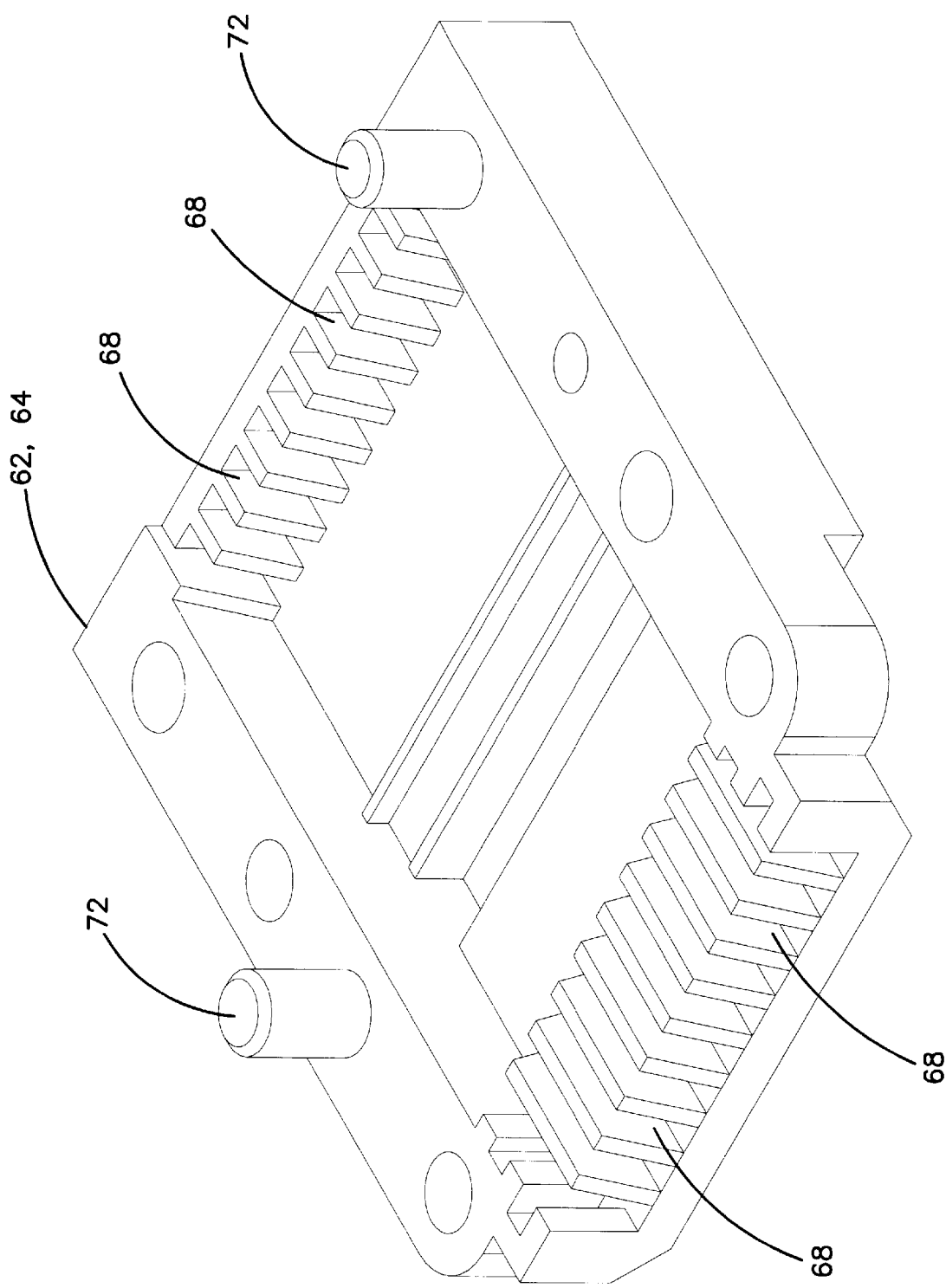
FIG. 5 is a perspective view of the back side of one of the spring holders of FIG. 4.

Referring to FIGS. 3 and 4, one of the jack access cards 26 is illustrated in isolation from the entire patching system 20. The jack access card 26 includes a front interface piece 54 defining upper and lower patch plug ports 56 and 58. The front interface piece 54 is connected to the circuit board 44. Upper and lower sets of springs 60 and 62 are secured to the board 44. The upper set of springs 60 is connected to the circuit board 44 by an upper spring holder 64, and the lower set of springs 62 is connected to the circuit board 44 by a lower spring holder 66. As shown in FIG. 5, the spring holders 64 and 66 (which have identical configurations) include a plurality of parallel slots or channels 68 for receiving and isolating the springs 60 and 62. The upper and lower spring holders 64 and 66 are preferably fastened to the circuit board 44 by conventional fasteners 70. The upper and lower holders 64 and 66 also preferably include alignment pegs 72 that fit within corresponding alignment openings defined by the circuit board 44.

The upper and lower patch plug ports 56 and 58 are each sized and shaped to receive only a single patch plug 74

(shown in FIGS. 6A–6C) at a time. For example, the ports 56 and 58 each have a generally rectangular shape that complements a rectangular profile (see FIG. 6B) of a single one of the patch plugs 74.

Referring to FIG. 6A, a patch cord 76 having patch plugs 74 is illustrated. As shown in FIG. 6B, each of the patch plugs 74 has a width $W_1$ and a height $H_1$. Each of the patch plugs 74 also includes a housing 78 having a receptacle or open end 80 (shown in FIG. 6B). A single row of contact springs 82 is mounted in the open end 80 of each housing 78. Each housing 78 also defines two recesses 84. As will be described later in the specification, the recesses 84 are used to assist in mechanically securing the patch plugs 74 within the patch plug ports 56 and 58.

Referring to FIG. 7, the front interface piece 54 of the jack access card 26 has a height $H_2$ and a width $W_2$. Preferably, the height $H_2$ is greater than two times the height $H_1$ of each patch plug 74, and the width $W_2$ is preferably less than two times the width $W_1$ of each patch plug 74. By selecting the width $W_2$ to be less than two times the width $W_1$, improved circuit density can be achieved. Also, by selecting the height $H_2$ to be greater than two times the height $H_1$, two or more of the patch plug ports 56 and 58 can be vertically spaced or aligned along a common vertical axis 86. This also assists in improving circuit density. The vertical axis 86 on which the patch plug ports 56 and 58 are preferably centered, is preferably offset from a central axis 88 of the front interface piece 54. The vertical axis 86 is aligned along a plane P that extends rearwardly through the front interface piece 54. As shown in FIG. 8, the circuit board 44 is offset from the plane P.

Referring back to FIGS. 3 and 4, the jack access card 26 also includes an upper resilient retaining member 90 corresponding to the upper patch plug port 56, and a lower resilient retaining member 92 corresponding to the lower patch plug port 58. The upper and lower retaining members 90 and 92 each have a generally cantilevered configuration and include inwardly projecting retaining tabs 94 (best shown in FIG. 7). When one of the patch plugs 74 is inserted within one of the patch plug ports 56 and 58, the retaining tabs 94 snap within the recesses 84 of the patch plug 74 to mechanically hold the plug 74 within the plug port.

The ports 56 and 58 preferably complement the profile of each plug 74 such that the plugs 74 can not be improperly inserted (i.e., inserted backwards or up-side-down) in the ports 56 and 58. For example, referring again to FIG. 7, each of the upper and lower patch plug ports 56 and 58 defines a generally rectangular recess 96 positioned opposite from the retaining tabs 94. Each rectangular recess 96 is configured to receive a corresponding rectangular projection 98 that extends outward from one side of each patch plug 74. As shown in FIG. 6B, the projection 98 is formed between two end notches 99.

Referring to FIG. 8, the jack access card 26 also includes left and right connecting structures 100 and 102. The left and right connecting structures 100 and 102 oppose one another and are generally parallel. Portions of the circuit board 44 and the upper and lower spring housings 64 and 66 are positioned between the left and right connecting structures 100 and 102.

Referring to FIG. 3, the right connecting structure 102 includes an upper extension 104, a lower extension 106, and an intermediate extension 108. The upper extension 104 is located above the upper retaining member 90, the lower extension 106 is located below the lower retaining member 92, and the intermediate extension 108 is located between the upper and lower retaining members 90 and 92. The intermediate extension 108 overlaps both of the upper and lower spring housings 64 and 66. Conventional fasteners 110 fasten the circuit board 44 and the spring housings 64 and 66 between the left and right connecting structures 100 and 102.

Referring to FIG. 4, the card edge contacts 30 of the circuit board 44 are positioned on an extension 112 that projects rearwardly from a main body of the circuit board 44. It will be appreciated that each card edge contact 30 has a corresponding contact located on the opposite side of the rear extension 112.

Still referring to FIG. 4, the circuit board 44 includes an upper set of spring contacts 114 and a lower set of spring contacts 116. The upper set of spring contacts 114 includes a column of front contacts 118 and a column of intermediate contacts 120. Similarly, the lower set of spring contacts 116 includes a column of front contacts 122 and a column of intermediate contacts 124. The front contacts 118 and 122 are positioned adjacent to a front edge of the circuit board 44, while the intermediate contacts 120 and 124 are positioned between the front contacts 118, 122 and the card edge contacts 30.

Figure 9A:
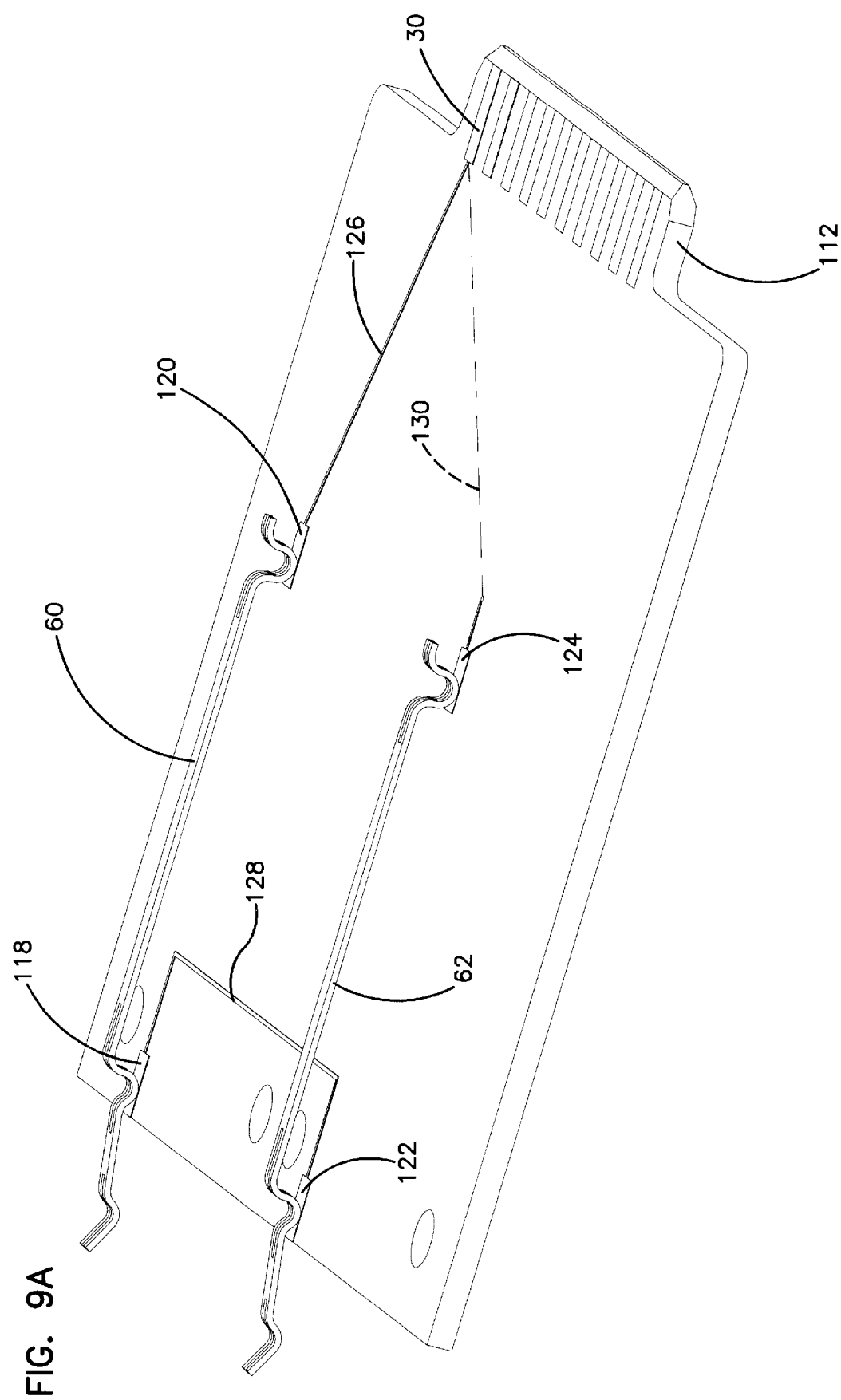
FIG. 9A illustrates a normally closed circuit path of the jack access card of FIG. 3.
Figure 9B:
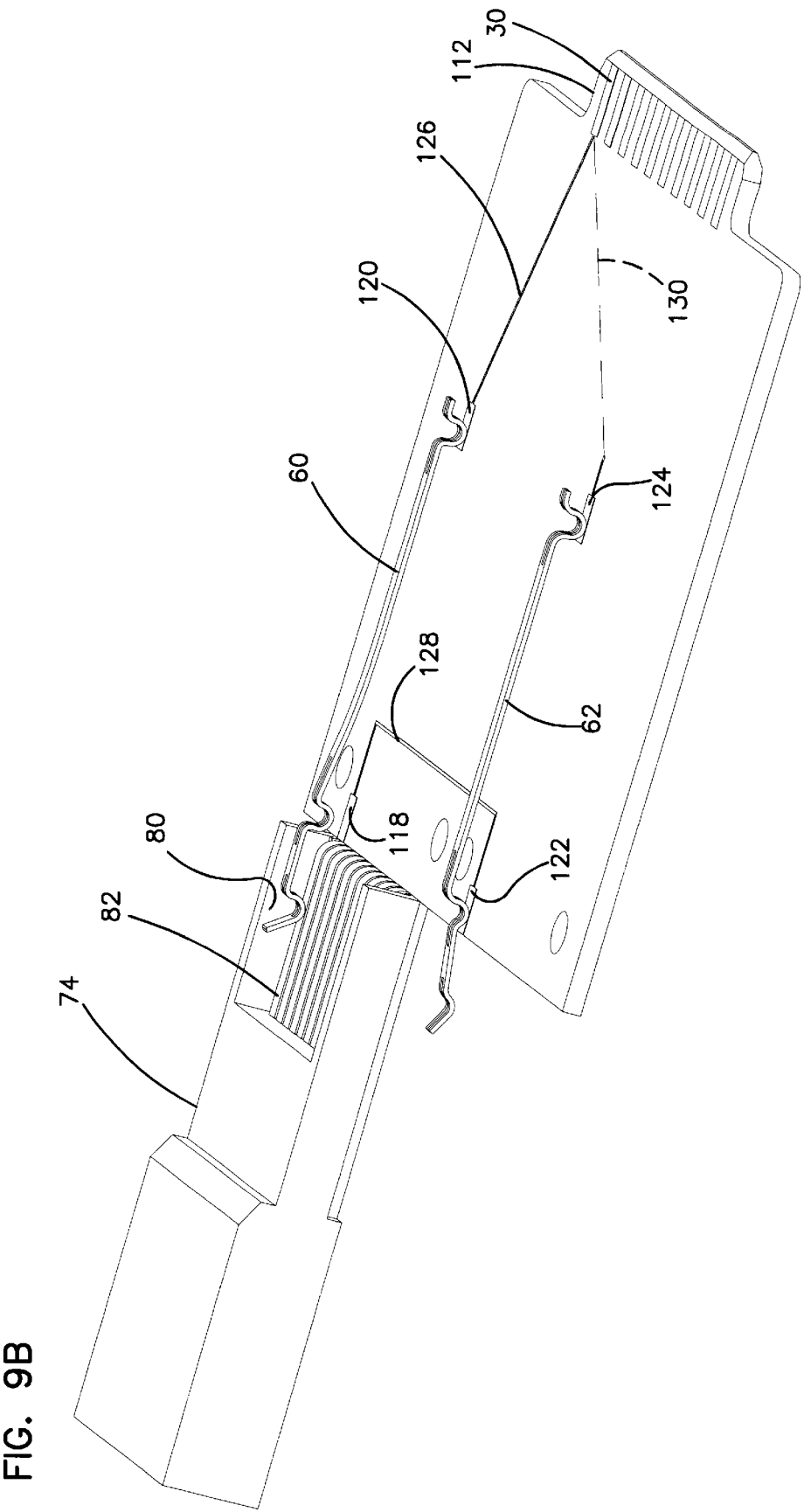
FIG. 9B illustrates an open or "patched" circuit of the jack access card of FIG. 3.

FIGS. 9A and 9B show a representative circuit or tracing layout for the circuit board 44. For clarity, only a single circuit path is illustrated. However, those of reasonable skill in the art will appreciate that similar circuit paths can be provided for each pair of card edge contacts 30.

Referring to FIG. 9A, one of the upper springs 60 and one of the lower springs 62 are each shown in a normally closed position. With the circuit normally closed. The springs 60 and 62 provide normal-through functionality for twisted pair balanced circuit applications. For example, in the normal orientation of FIG. 9A, the circuit path extends from one of the card edge contacts 30 through tracing 126 to one of the intermediate contacts 120. From the intermediate contact 120, the circuit path extends through spring 60 to front contact 118. From front contact 118, the circuit path moves through tracing 128 to front contact 122. Next, the circuit path moves through spring 62 from the front contact 122 to the intermediate contact 124. Finally, the circuit path moves through tracing 130 to another of the card edge contacts that is located on the under side of the circuit board 44 at a position opposite from the originating contact 30.

When the jack access card 26 is in the normally closed position of FIG. 9A, a transmission from a user's transmitter enters the patching system 20 through the rear interface module 28 and travels through the circuit path shown in FIG. 9A. After traveling through the circuit path of FIG. 9A, the transmission exits the patching system 20 through the rear interface module 28 and travels to the user's normal receiver. If it is desired to divert the signal traveling through the jack access card 26, one of the patching plugs 74 is inserted into one of the patch plug ports 56, 58. With the plug 74 inserted within one of the plug ports 56, 58, the circuit path of FIG. 9A is opened and the signal is patched through the patch plug 74 to an alternative piece of receiving equipment.

FIG. 9B illustrates a representative patching configuration. In FIG. 9B, one of the patch plugs 74 (with portions of the housing 78 removed to improve the visibility of the contact springs 82) has been inserted in the upper patch plug port 56. When the plug 74 is inserted in the upper port 56, the spring 60 is flexed away from the circuit board 44 such that the spring 60 disconnects from the front contact 118. Concurrently, the spring 60 makes contact with one of the contact springs 82 of the patch plug 74. Consequently, the signal traveling through the circuit pathway is patched from the spring 60 to the patch plug 74. From the patch plug 74, the signal travels through patch cord 76 to the alternative receiving equipment. When the user has finished patching the signal, the plug 74 is removed from the plug port 56 and the spring 60 flexes back into engagement with the front contact 118 thereby closing the circuit.

Figure 10:
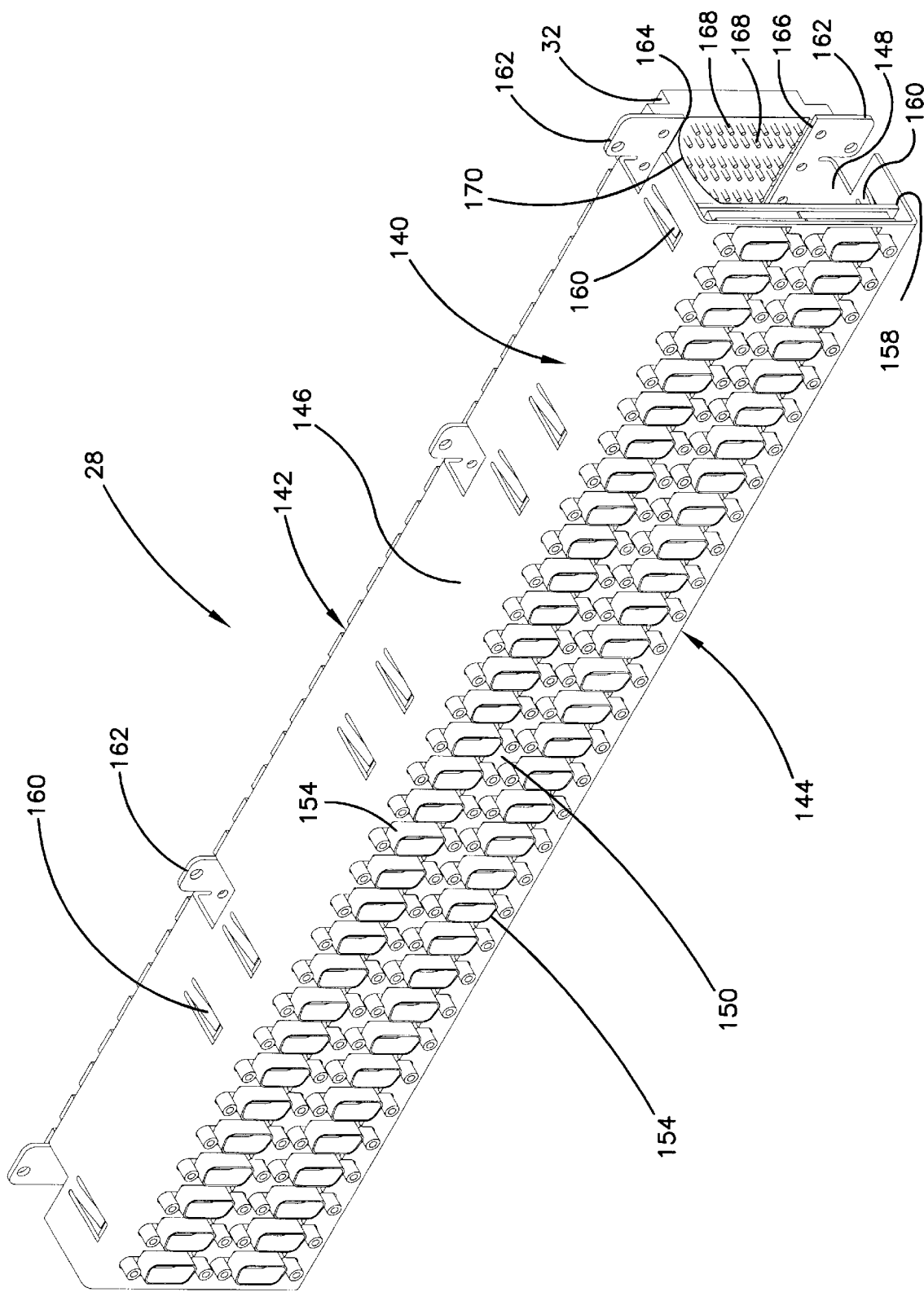
FIG. 10 is a rear perspective view of a rear interface module suitable for use with the high density patching system of FIG. 1.
Figure 11:
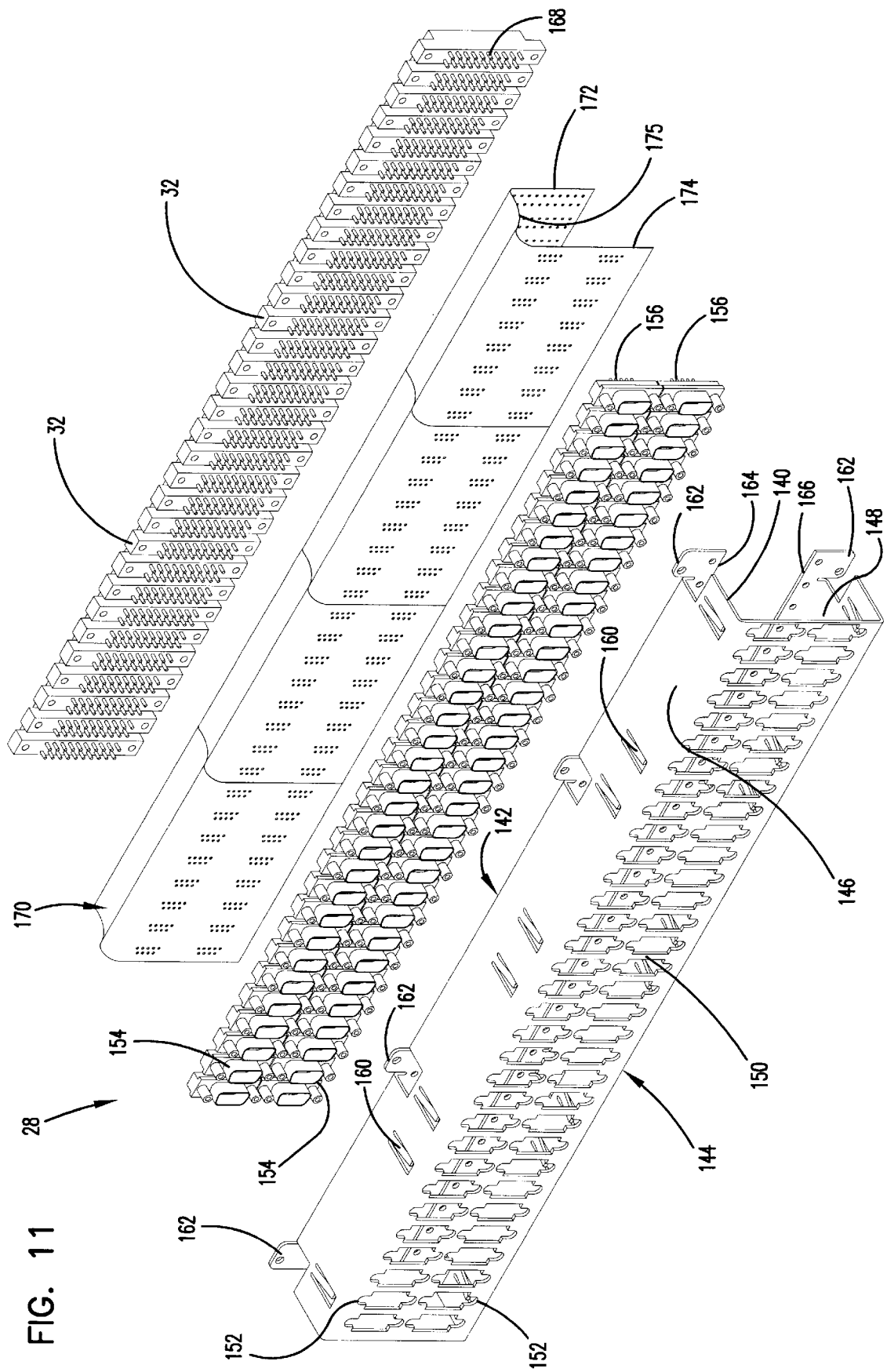
FIG. 11 is an exploded view of the rear interface module of FIG. 10.

FIGS. 10 and 11 show the rear interface module 28 in isolation from the patching system 20. The rear interface module 28 includes a frame 140 preferably made from bent sheet metal. The frame includes a front end 142 positioned opposite from a rear end 144. The frame 140 also includes opposing top and bottom walls 146 and 148 that extend between the front and rear ends 142 and 144. A rear wall 150 interconnects the top and bottom walls 146 and 148. As best shown in FIG. 11, the rear wall 150 defines two vertically spaced-apart rows of openings 152.

The rear interface module 28 also includes two vertically spaced-apart rows of rear connectors 154 mounted at the rear wall 150. At least portions of the rear connectors 154 preferably extend through the vertically spaced-apart openings 152. The rear connectors 154 preferably include connecting pins 156 (shown in FIG. 11) that project generally toward the front end 142 of the frame 140. The rear connectors 154 are held in place by a board 158 (shown in FIG. 10) that is snap fit within the frame 140 and held against the rear connectors 154 by resilient tabs 160. The board 158 preferably includes a plurality of openings for allowing the pins 156 to pass through.

The frame 140 includes the plurality of top and bottom ears 162 for allowing the frame 140 to be fastened (e.g., by conventional fasteners such as screws or bolts) to the rear of the card housing 24. The frame 140 also includes top and bottom flanges 164 and 166 located at the front end 142 of the frame 140. The top flange 164 extends downward from the top wall 146, and the bottom flange 166 extends upward from the top wall 148. The top and bottom flanges 164 and 166 define a plurality of openings for receiving fasteners (e.g., bolts or screws) used in securing the card edge connectors 32 to the front end 142 of the frame 140. As mounted at the front end 142 of the frame, the card edge connectors 32 are preferably aligned in a single row. Pins 168 of the card edge connectors 130 preferably extend toward the rear end 144 of the frame 140 and project through a gap defined between the top and bottom flanges 164 and 166. In other embodiments, the card edge connectors 130 can be mounted inside the flanges 164 and 166 with receptacles of the connectors 130 projecting forwardly through the gap between the flanges 164 and 166.

Figure 14:
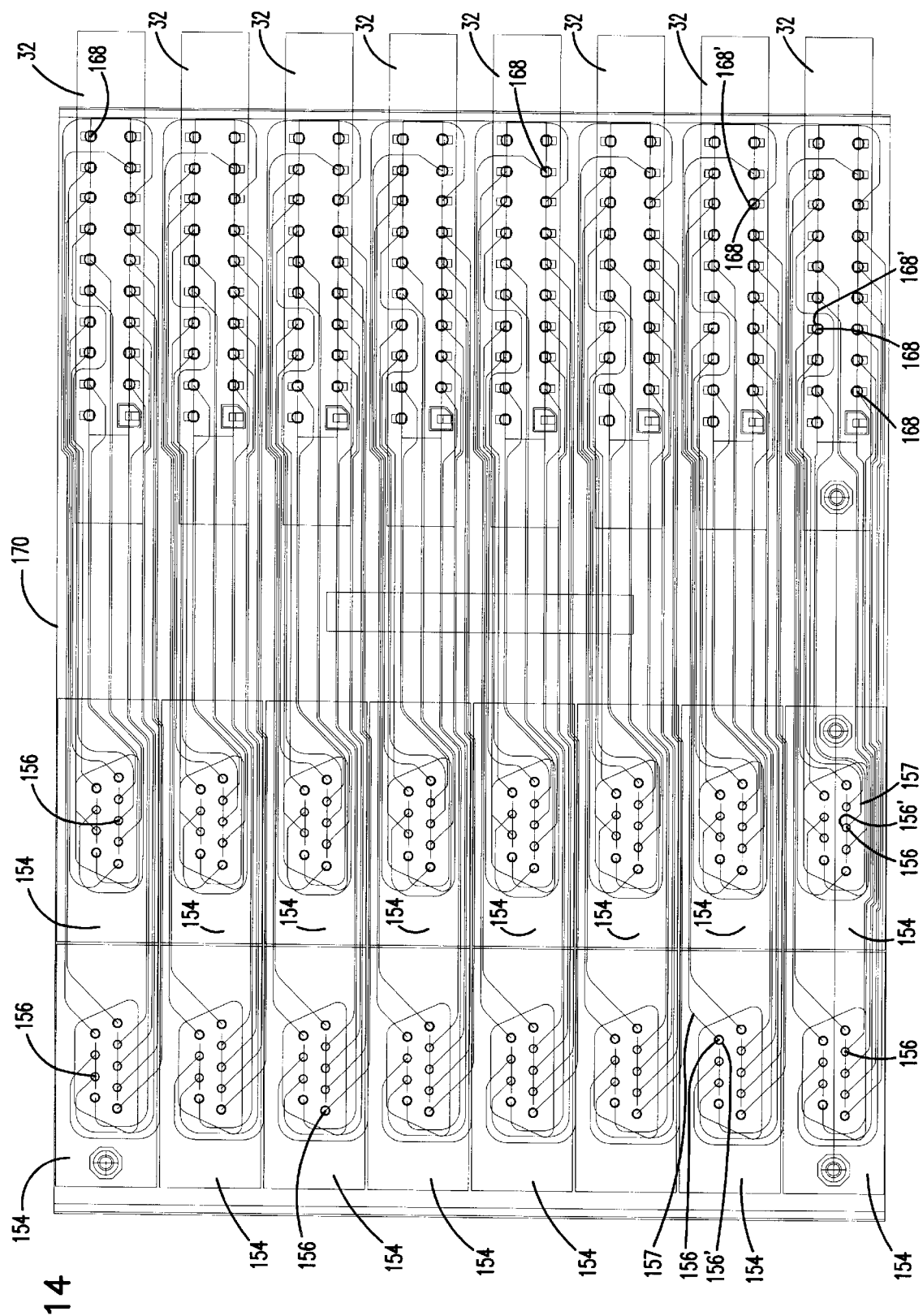
FIG. 14 illustrates a flexible circuit wiring diagram for one of the card edge connectors of the rear interface module, and its corresponding pair of rear connectors.

The rear connectors 154 are preferably arranged in an array having two vertically spaced apart rows. The pins 156 of the rear connectors 154 are preferably connected to the pins 168 of the card edge connectors 32 through the use of a flexible circuit board 170. The flexible circuit board 170 is located between the top and bottom walls 146 and 148 of the frame 140. Preferably, the flexible circuit board 170 includes a generally planar front portion 172 having electrical contacts that contact the pins 168 of the card edge connectors 32, and generally planar rear portion 174 having electrical contacts that engage the pins 156 of the rear connectors 154. A flexed intermediate portion 175 curves between the front and rear portions 172 and 174. A tracing diagram for eight pairs of vertically spaced-apart rear connectors 154 and their corresponding card edge connectors 32 is shown in FIG. 14. In the embodiment shown, the rear connectors 154 each include nine pins 168, while the card edge connectors 32 each have a total of 20 pins. The extra pins on the card edge connectors 32 allow for expansion and/or modification of the type of rear connectors used.

The pins 156 and 168 respectively extend through plated through-holes 156' and 168' of the flexible circuit board 170. Tracings 157 electrically interconnect selected ones of the through-holes 156' with selected ones of the through holes 168'.

Referring now to FIGS. 12A–12D, various views of one of the card edge connectors 32 are shown. The card edge connector 32 includes a dielectric housing 176 defining a central slot 178 sized for receiving one of the rear extensions 112 of the jack access cards 26. A plurality (e.g., 20) of opposing electrical contacts 180 are positioned within the slot 178. When the rear extension 112 of the jack access card 126 is inserted within the slot 178, the electrical contacts 180 engage the card edge contacts 30 of the jack access card 26. In this manner, an electrical connection is provided between the Jack access card 26 and the card edge connector 32.

Figure 12A:
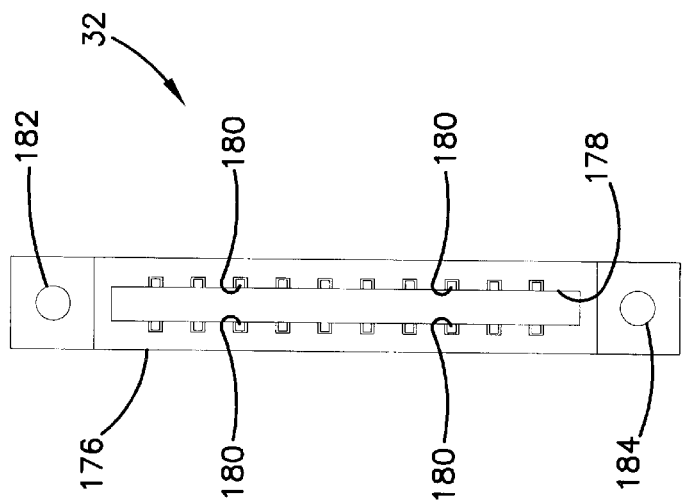
FIG. 12A is a front view of a card edge connector suitable for use with the rear interface module of FIG. 10.
Figure 12D:
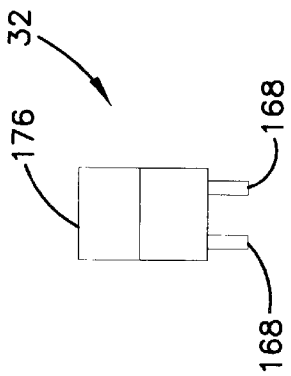
FIG. 12D is a bottom view of the card edge connector of FIG. 12A.
Figure 12B:
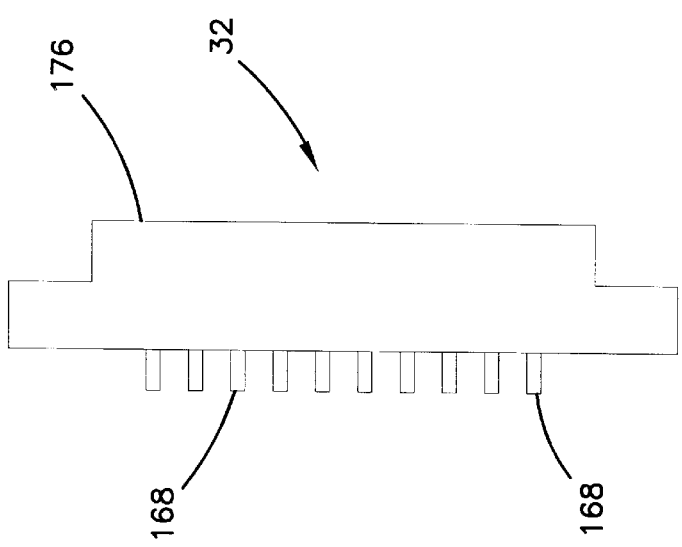
FIG. 12B is a side view of the card edge connector of FIG. 12A.
Figure 12C:
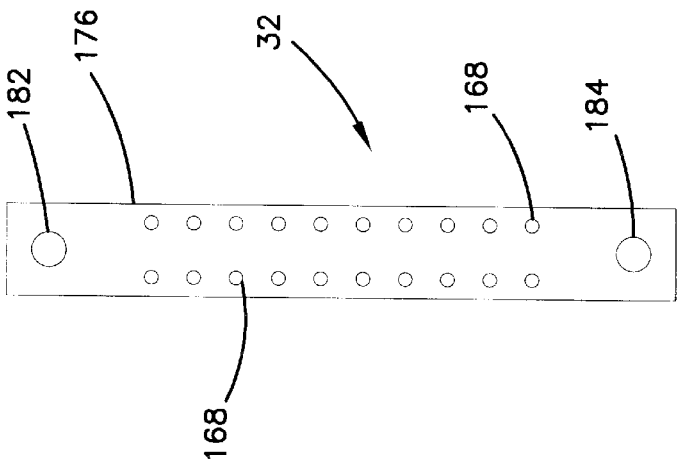
FIG. 12C is a rear view of the card edge connector of FIG. 12A.

The electrical contacts 180 are connected to the pins 168 that provide electrical connections with the flexible circuit board 170. As shown in FIGS. 12B–12D, the pins 168 project transversely outward from a back side of the housing 176. The housing 176 also defines top and bottom screw openings 182 and 184 for allowing the card edge connector to be fastened to the frame 140.

FIGS. 13A–13D illustrate various views of one of the rear connectors 154. As shown in 13A–13D, the rear connector 154 comprises a nine-pin D-subminiature type connector. The connector 156 includes a dielectric member 186. The pins 156 project outward from one side of the dielectric member 186, while a D-type fitting 188 projects outward from the other side of the dielectric member 186. The D-fitting 188 comprises a female fitting having a plurality of receptacles 190. However, it will be appreciated that in alternative embodiments 25 pin D-type fittings, AT&T 110 D-type connectors, EDAC-90 connectors, EDAC-120 connectors, EDAC-56 connectors, co-axial connectors, AMP-Champ 50 pin connectors, SVHS connectors and QCP-type connectors, as well as other types of connectors, could also be used.

It will be appreciated that the modular nature of the rear interface module 28 allows the entire module 28 to be disconnected from the chassis 22 and replaced with another module (e.g., a module having a different type of rear connector). In this manner, a user can easily modify the array of rear connectors so as to accommodate different types of transmitting and receiving equipment. Thus, user flexibility for cable termination connector options is improved.

Figure 15:
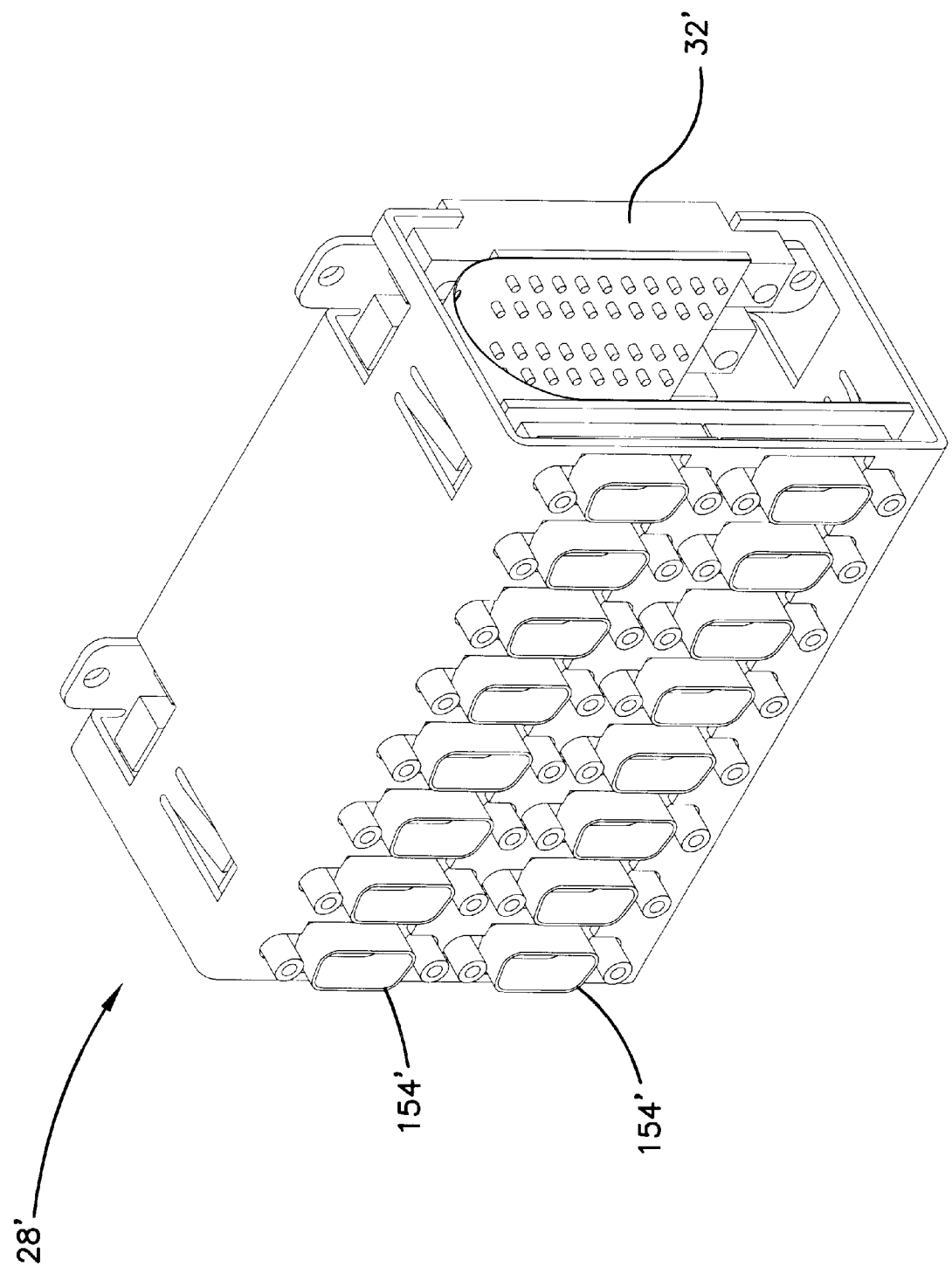
FIG. 15 illustrates an alternative rear interface module constructed in accordance with the principles of the present invention.

FIG. 15 illustrates an alternative rear interface module 28' adapted to be connected to the chassis 22. The interface module 28' is an eight circuit module (i.e., the module includes eight card edge connectors 32' and eight pairs of rear connectors 154'). Preferably, four of the modules 28' would be removably mounted at the back end of the card housing 24 (shown in FIGS. 1 and 2). In this manner, flexibility for cable termination connector options is further enhanced by allowing selected groups of the connectors to be changed/replaced without disturbing others of the connectors. It will be appreciated that other sized modules could also be used. By way of non-limiting example, one, two, four and sixteen circuit modules could be used.

With regard to the foregoing description, it is to be understood that changes can be made in detail, especially in matters of the construction materials employed and the shape, size and arrangement of the parts without departing from the scope of the present invention. It is intended that the specification and the depicted aspects be considered exemplary only, with a true scope and spirit of the invention being indicated by the broad meaning of the following claims.

We claim:

1. A jack access card adapted for use with patch cords having patch plugs, the jack access card comprising:
    a circuit board including a front end positioned opposite from a rear end, and a first side positioned opposite from a second side;
    an upper set of springs that extend along the first side of the circuit board;
    a lower set of springs that extend along the first side of the circuit board beneath the upper set of springs;
    an elongated front interface piece positioned at the front of the circuit board, the elongated front interface having an elongated dimension;
    the front interface piece defining upper and lower patch plug ports that are centered along a plane P that extends rearwardly through the front interface piece, the circuit board being offset from the plane P, each of the upper and lower patch plug ports having a height and a width, the height extending along the elongated dimension of the front interface piece, the height being greater than the width;
    the upper set of springs being arranged to provide a connection with a patch plug inserted in the upper patch plug port; and
    the lower set of springs being arranged to provide a connection with a patch plug inserted in the lower patch plug port.

2. A jack access card adapted for use with patch cords having patch plugs, the jack access card comprising:
    a circuit board including a front end positioned opposite from a rear end, and a first side positioned opposite from a second side, the circuit board having first contacts and second contacts located on the first side;
    a front interface piece positioned at the front of the circuit board;
    the front interface piece defining upper and lower patch plug ports;
    the card including springs mounted exclusively at the first side of the circuit board such that no springs are mounted at the second side of the circuit board, the springs including an upper set of springs corresponding to the upper port and a lower set of springs corresponding to the lower port, each of the sets of springs being configured to extend between and contact the first contacts and the second contacts of the circuit board, the upper set of springs being arranged to disconnect from the first contacts when a patch plug is inserted within the upper port and the lower set of springs being arranged to disconnect from the first contacts when a patch plug is inserted within the lower port.

3. A telecommunications card comprising:
    a circuit board including a front end positioned opposite from a rear end, the circuit board also including top and bottom edges that extend between the front and rear ends of the circuit board;
    a plurality of card edge contacts positioned adjacent the rear end of the circuit board;
    an elongated, dielectric interface piece positioned at the front of the circuit board,
    the interface piece having a length that extends in a generally vertical orientation; and the interface piece defining at least first and second plug ports that are centered along a generally vertical plane P that extends rearwardly through the interface piece, the circuit board being offset from the plane P, the first and second plug ports being vertically spaced-apart.

4. The telecommunications card of claim 3, wherein the plug ports are generally rectangular.

5. The telecommunications card of claim 3, further comprising at least one fastening structure coupled to the interface piece for fastening the telecommunications card to a chassis.

6. The telecommunications card of claim 5, wherein the fastening structure includes a screw.

7. The telecommunications card of claim 3, wherein the plane P is parallel to the circuit board.

8. A rear interface module for a high density patching system, the rear interface module comprising:
    a frame including a front end positioned opposite from a rear end, the frame also including opposing top and bottom walls extending between the front and rear ends, the frame further including a rear wall that interconnects the top and bottom walls, the rear wall being located at the rear end of the frame and defining two vertically spaced-apart rows of openings;
    a single row of card edge connectors positioned at the front end of the frame, the card edge connectors including a plurality of first pins that project toward the rear end of the frame;
    two vertically spaced-apart rows of rear connectors mounted at the rear wall, at least portions of the rear connectors extending through the vertically spaced-apart openings, the rear connectors including a plurality of second pins that project toward the front end of the frame; and
    a flexible circuit board positioned between the top and bottom walls of the frame, the flexible circuit board providing electrical connections between the first and second pins.

9. The rear interface module of claim 8, wherein the flexible circuit board includes a generally planar front portion having electrical contacts that engage the first pins, a generally planar rear portion having electrical contacts that engage the second pins, and a flexed intermediate portion that curves between the front and rear portions.

10. The rear interface module of claim 8, wherein the frame includes top and bottom flanges located at the front end of the frame, the front flange extending downward from the top wall and the bottom flange extending upward from the bottom wall, the top and bottom flanges defining a mounting gap.

11. The rear interface module of claim 10, wherein the card edge connectors are fastened to the top and bottom flanges, and the first pins extend through the mounting gap.

12. The rear interface module of claim 8, wherein the rear connectors comprise nine-pin D-subminiature type connectors.

* * * * *